(12) United States Patent
Hayashi (10) Patent No.: US 12,457,299 B2
(45) Date of Patent: Oct. 28, 2025

(54) IMAGE FORMING APPARATUS TO ACQUIRE GROUP INFORMATION OF USER, SPECIFYING SETTINGS FOR IMAGE PROCESSING AND RECORD HISTORY INFORMATION, IMAGE FORMING METHOD, AND NON-TRANSITORY COMPUTER READABLE MEDIUM

(71) Applicant: FUJIFILM Business Innovation Corp., Tokyo (JP)

(72) Inventor: Manabu Hayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 476 days.

(21) Appl. No.: 17/880,780

(22) Filed: Aug. 4, 2022

(65) Prior Publication Data
US 2023/0300276 A1    Sep. 21, 2023

(30) Foreign Application Priority Data
Mar. 18, 2022   (JP) ................................. 2022-044190

(51) Int. Cl.
*H04N 1/44*   (2006.01)
*G06F 21/60*   (2013.01)
*H04N 1/00*   (2006.01)
*B41J 2/045*   (2006.01)

(52) U.S. Cl.
CPC ......... *H04N 1/4433* (2013.01); *G06F 21/602* (2013.01); *G06F 21/608* (2013.01); *H04N 1/00079* (2013.01); *H04N 1/444* (2013.01); *H04N 1/4486* (2013.01); *B41J 2/04536* (2013.01); *H04N 1/00244* (2013.01); *H04N 2201/0094* (2013.01)

(58) Field of Classification Search
None
See application file for complete search history.

(56) References Cited

U.S. PATENT DOCUMENTS

| 6,567,180 | B1 * | 5/2003 | Kageyama ............ G06F 3/1204 358/1.14 |
| 10,445,031 | B2 | 10/2019 | Ikari |
| 2007/0143361 | A1 | 6/2007 | Arai et al. |

(Continued)

FOREIGN PATENT DOCUMENTS

| JP | 4752480 B2 | 8/2011 |
| JP | 2018-78531 A | 5/2018 |
| JP | 2020-155005 A | 9/2020 |

*Primary Examiner* — Haris Sabah
(74) *Attorney, Agent, or Firm* — Oliff PLC (57) ABSTRACT

An image forming apparatus includes a processor configured to: acquire group information about a group to which a user who has issued an instruction for performing a process belongs; acquire setting information specifying settings for processing regarding image and history information in which image information indicating content of target image data for which the process is performed and history information about the process are recorded in association with each other, the setting information being associated with the group identified based on the acquired group information, from an external apparatus; and perform, after performing the process instructed by the user, the processing regarding the image and history information in accordance with the settings specified in the acquired setting information.

19 Claims, 7 Drawing Sheets

(56) References Cited

U.S. PATENT DOCUMENTS

| | | | |
|---|---|---|---|
| 2015/0062639 A1* | 3/2015 | Goto | H04N 1/32112 |
| | | | 358/1.15 |
| 2015/0347881 A1* | 12/2015 | Yoshida | G06F 3/126 |
| | | | 358/1.15 |
| 2017/0094118 A1* | 3/2017 | Fujii | G06F 3/1267 |
| 2018/0109686 A1* | 4/2018 | Hagiwara | H04N 1/00503 |
| 2020/0265126 A1* | 8/2020 | Matsuda | G06F 3/1285 |
| 2022/0019393 A1* | 1/2022 | Hamada | G06F 3/1263 |

* cited by examiner

| USER NAME | GROUP IDENTIFIER | GROUP NAME |
|---|---|---|
| USER 1 | 0001 | COMPANY A |
| USER 2 | 0002 | COMPANY B |
| USER 3 | 0001 | COMPANY A |
| USER 4 | 0001 | COMPANY A |
| USER 5 | 0002 | COMPANY B |
| USER 6 | 0003 | COMPANY C |
| USER 7 | 0001 | COMPANY A |
| USER 8 | 0003 | COMPANY C |
| USER 9 | 0003 | COMPANY C |

FIG. 5

| GROUP IDENTIFIER | 0001 | 0002 | 0003 |
|---|---|---|---|
| GROUP NAME | COMPANY A | COMPANY B | COMPANY C |
| CREATION OF IMAGE LOG | YES | NO | YES |
| IMAGE LOG TARGET SERVICE | ALL SERVICES | — | FACSIMILE |
| IMAGE LOG RESOLUTION | 200 dpi | — | 72 dpi |
| IMAGE FORMAT | PDF | — | TIFF |
| TARGET PAGE(S) | ALL PAGES | — | FIRST PAGE |
| TRANSFER DESTINATION IP ADDRESS | XXX.XXX.XXX.XXX (IMAGE LOG SERVER A) | — | YYY.YYY.YYY.YYY (IMAGE LOG SERVER C) |
| PUBLIC KEY | AAAA | — | — |
| ADMINISTRATOR EMAIL ADDRESS | admin@XXXX.co.jp | — | admin@YYYY.co.jp |

IMAGE FORMING APPARATUS TO ACQUIRE GROUP INFORMATION OF USER, SPECIFYING SETTINGS FOR IMAGE PROCESSING AND RECORD HISTORY INFORMATION, IMAGE FORMING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-044190 filed Mar. 18, 2022.

BACKGROUND

(i) Technical Field

The present disclosure relates to an image forming apparatus, an image forming method, and a non-transitory computer readable medium.

(ii) Related Art

In Japanese Patent No. 4752480, a technique for, at the time of executing a job, creating a log image from an image handled in the job and transferring the log image and a job log to an external apparatus is described.

In Japanese Unexamined Patent Application Publication No. 2020-155005, a technique for, when generating use history information about the apparatus use history of a user, storing the use history information into a storage region corresponding to a group to which the user belongs, is described.

SUMMARY

A technique of an image forming apparatus for creating, as the history of a process such as facsimile or copy, image and history information in which image information indicating content of image data for which the process is performed and history information about the process are recorded, is suggested. For example, processing regarding image and history information as to whether or not the image and history information is to be created may be set in advance for each group as an operating policy for image and history information about a group to which a user belongs. In the case where an image forming apparatus is used by users belonging to multiple groups, if the same operating policy for image and history information is applied to all the users, operating policies for image and history information corresponding to individual groups are not able to be handled.

Aspects of non-limiting embodiments of the present disclosure relate to providing an image forming apparatus, an image forming method, and a non-transitory computer readable medium that are capable of providing different settings for processing regarding image and history information for individual groups.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a processor configured to: acquire group information about a group to which a user who has issued an instruction for performing a process belongs; acquire setting information specifying settings for processing regarding image and history information in which image information indicating content of target image data for which the process is performed and history information about the process are recorded in association with each other, the setting information being associated with the group identified based on the acquired group information, from an external apparatus; and perform, after performing the process instructed by the user, the processing regarding the image and history information in accordance with the settings specified in the acquired setting information.

BRIEF DESCRIPTION OF THE DRAWINGS

An exemplary embodiment of the present disclosure will be described in detail based on the following figures, wherein.

DETAILED DESCRIPTION

Figure 1:
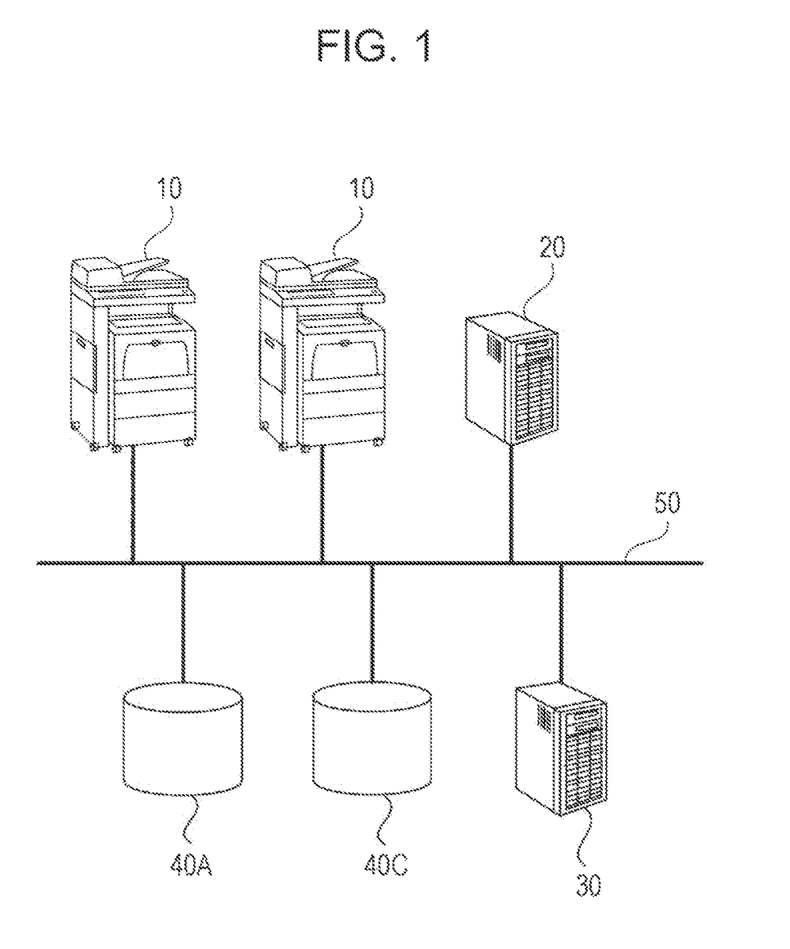
FIG. 1 is a diagram illustrating a system configuration of an image forming system according to an exemplary embodiment of the present disclosure.

Hereinafter, an exemplary embodiment of the present disclosure will be described in detail with reference to drawings. FIG. 1 is a diagram illustrating a system configuration of an image forming system according to an exemplary embodiment of the present disclosure.

Image forming apparatuses 10 included in an image forming system 1 are capable of creating an image log, as the history of a process such as facsimile or copy, in which image information indicating content of image data for which the process is performed and history information about the process are recorded. An image log corresponds to image and history information used in a technique of the present disclosure. The image forming apparatuses 10 are installed in places that may be used by users who belong to various groups, such as shared spaces for multiple companies or departments, convenience stores, or shared offices. An operating policy regarding an image log as to, for example, whether or not the image log is to be created, differs depending on the group such as a company or a department.

In the image forming system 1 according to this exemplary embodiment, the image forming apparatuses 10 used by users belonging to various groups are capable of handling creation of image logs in different manners depending on the groups in accordance with operating policies regarding image logs for the groups to which the users belong.

As illustrated in FIG. 1, the image forming system 1 includes, for example, the image forming apparatuses 10, an authentication server 20, a security server 30, and image log servers 40A and 40C. The image forming apparatuses 10, the authentication server 20, the security server 30, and the image log servers 40A and 40C are connected to one another via a network 50.

The image forming apparatuses 10 are so-called multi-function machines including multiple functions such as a print function, a scan function, a copy function, and a facsimile function.

The authentication server 20 manages information about a group to which a user of each of the image forming apparatuses 10 belongs.

The security server 30 manages, for each group, setting information in which settings for processing regarding an image log are specified.

The image log servers 40A and 40C are servers that store image logs created by the image forming apparatuses 10 and are provided for individual groups. The image log server 40A is a server that stores an image log created when a user who belongs to a company A uses an image forming apparatus 10. The image log server 40C is a server that stores an image log created when a user who belongs to a company C uses an image forming apparatus 10.

Figure 2:
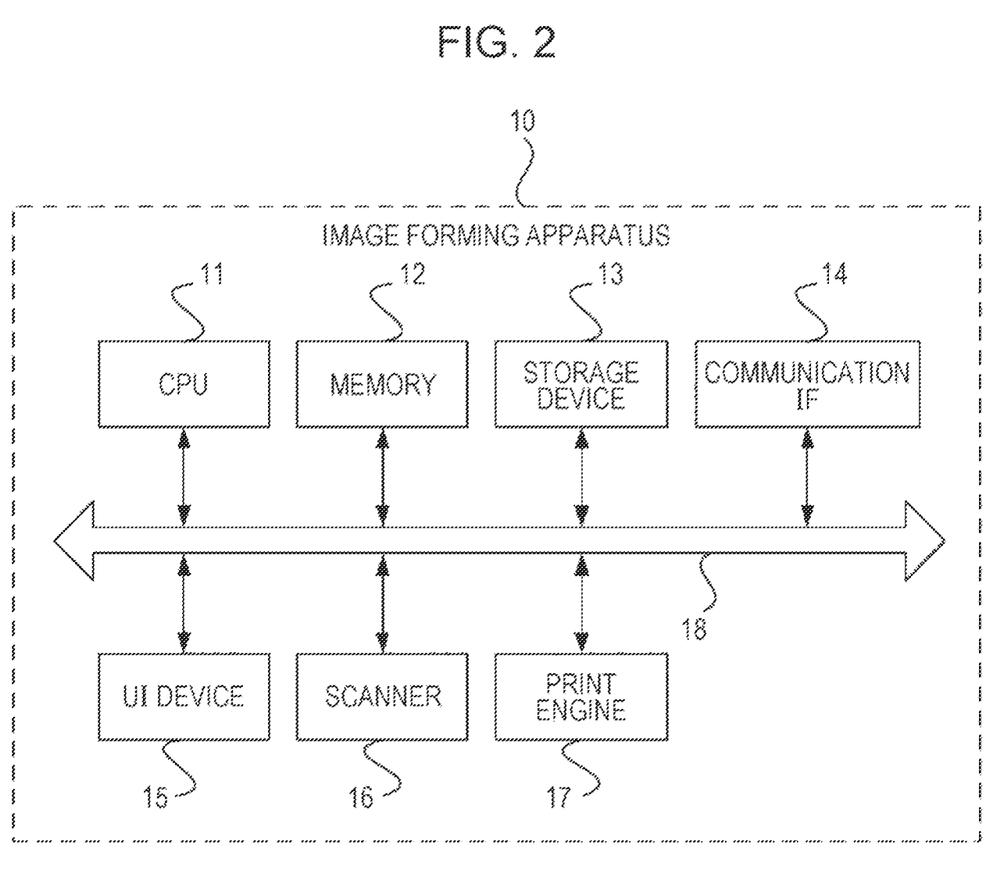
FIG. 2 is a block diagram illustrating a hardware configuration of an image forming apparatus according to an exemplary embodiment of the present disclosure.

FIG. 2 illustrates a hardware configuration of an image forming apparatus 10 in the image forming system 1 according to this exemplary embodiment.

The image forming apparatus 10 includes, as illustrated in FIG. 2, a central processing unit (CPU) 11, a memory 12, a storage device 13 such as a hard disk drive, a communication interface (IF) 14, a user interface (UI) device 15 that includes a touch panel or a liquid crystal display and a keyboard, a scanner 16, and a print engine 17. The CPU 11, the memory 12, the storage device 13, the communication IF 14, the UI device 15, the scanner 16, and the print engine 17 are connected to one another via a control bus 18.

The communication IF 14 transmits and receives data to and from an external apparatus or the like via the network 50. The UI device 15 receives an input of an instruction from a user. The scanner 16 reads, as image data, a document loaded to the image forming apparatus 10. The print engine 17 prints an image on a recording medium such as printing paper by going through processes including charging, exposure, development, transfer, and fixing.

The CPU 11 is a processor that controls an operation of the image forming apparatus 10 by performing a predetermined process based on a control program stored in the memory 12 or the storage device 13. In this exemplary embodiment, the CPU 11 reads and executes the control program stored in the memory 12 or the storage device 13. However, the control program is not necessarily stored in the memory 12 or the storage device 13. The control program may be recorded in a computer-readable recording medium and provided. For example, the program may be recorded in an optical disc such as a compact disc-read only memory (CD-ROM) or a digital versatile disc-read only memory (DVD-ROM) or a semiconductor memory such as a universal serial bus (USB) memory or a memory card. Furthermore, the control program may be acquired from an external apparatus via a communication line connected to the communication IF 14.

Figure 3:
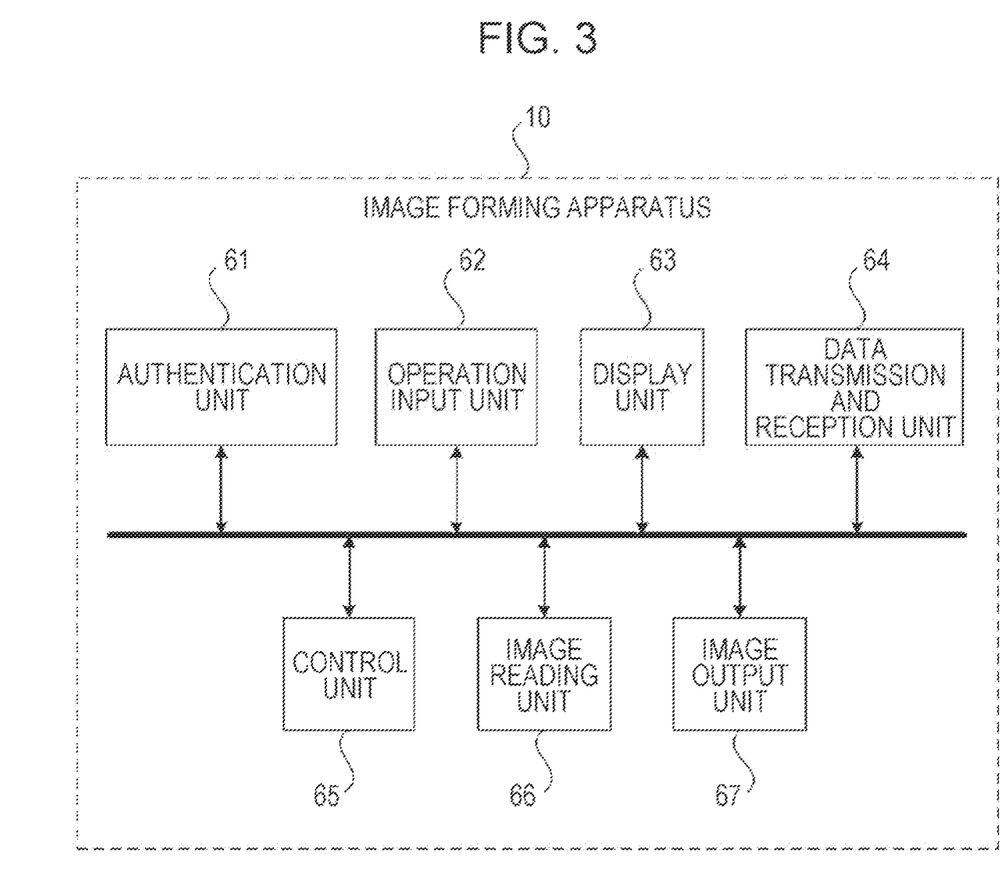
FIG. 3 is a block diagram illustrating a functional configuration of an image forming apparatus according to an exemplary embodiment of the present disclosure.

FIG. 3 is a block diagram illustrating a configuration of functions of the image forming apparatus 10 implemented when the control program described above is executed.

The image forming apparatus 10 according to this exemplary embodiment includes, as illustrated in FIG. 3, an authentication unit 61, an operation input unit 62, a display unit 63, a data transmission and reception unit 64, a control unit 65, an image reading unit 66, and an image output unit 67.

The authentication unit 61 performs authentication processing for a user who wants to use the image forming apparatus 10. The operation input unit 62 inputs information of various operations performed by the user. The display unit 63 presents, under the control of the control unit 65, various types of information to the user. The data transmission and reception unit 64 transmits and receives data to and from external apparatuses such as the authentication server 20, the security server 30, and the image log servers 40A and 40C.

The control unit 65 controls the overall operations of the image forming apparatus 10. The control unit 65 performs, for example, control for causing the image reading unit 66 to read a document image and control for causing the image output unit 67 to output print data, in accordance with an input of an instruction from the user.

The image reading unit 66 reads, under the control of the control unit 65, a document image from a loaded document. The image output unit 67 outputs, under the control of the control unit 65, an image onto a recording medium such as printing paper.

In the image forming system 1 according to this exemplary embodiment, as described above, the image forming apparatus 10 used by users belonging to various groups is capable of handling creation of an image log in different manners depending on the groups in accordance with operating policies regarding image logs for the groups to which the users belong.

The control unit 65 acquires group information about a group to which a user who has issued an instruction for performing a process belongs, and acquires from the security server 30 setting information that specifies settings for processing regarding an image log in which image information indicating content of target image data for which the process is performed and history information about the process are recorded in association with each other and is associated with the group identified based on the acquired group information. After the process instructed by the user is performed, the control unit 65 performs the processing regarding the image log in accordance with the settings specified in the acquired setting information.

The settings include a setting regarding whether or not an image log of the executed process needs to be created. In the case where the acquired setting information indicates that the image log needs to be created, the control unit 65 may, after the process instructed by the user is performed, create the image log in which image information indicating the content of the target image data for which the process has been performed and the history information about the process are recorded in association with each other.

Furthermore, the settings include a setting regarding whether or not transfer destination information about a transfer destination for the image log is present. In the case where transfer destination information is present in the acquired setting information, the control unit 65 may transfer the created image log to a transfer destination indicated by the transfer destination information.

In the case where transfer of an image log has failed, the control unit 65 may notify an administrator of a group to which a user who has issued an instruction for performing a process for which transfer has failed belongs that the transfer of the image log has failed.

Furthermore, in the case where transfer of an image log has failed, the control unit 65 may prohibit users belonging to a group to which a user who has issued an instruction for performing a process for which transfer has failed belongs from using the apparatus.

Furthermore, in the case where transfer of an image log has failed, the control unit 65 may notify users belonging to a group to which a user who has issued an instruction for performing a process for which transfer has failed belongs that the users are prohibited from using the apparatus.

Furthermore, the settings include a setting regarding whether or not the image log needs to be made confidential. In the case where the acquired setting information indicates that the image log needs to be made confidential, the control unit 65 may perform processing for making the created image log confidential. The processing for making the image log confidential may be encrypting the image log by a public key based on a public-key cryptography.

Next, a process performed in this exemplary embodiment will be described in detail. First, the authentication server 20 and the security server 30 will be described.

Figure 4:
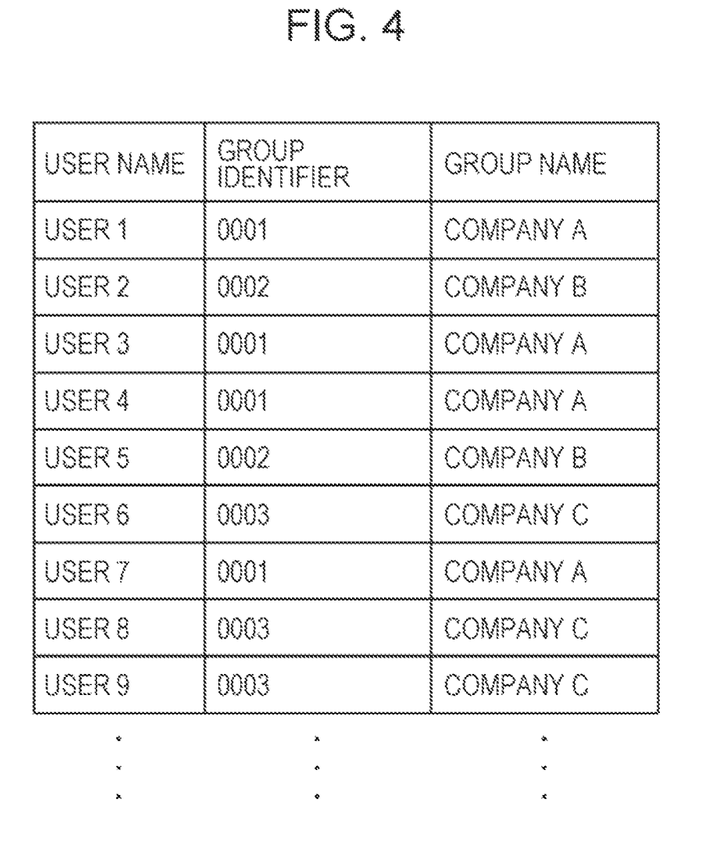
FIG. 4 is a diagram illustrating an example of a user management table managed in an authentication server.

FIG. 4 illustrates an example of a user management table managed in the authentication server 20. As illustrated in FIG. 4, in the user management table, users and group information about groups to which the users belong are recorded in association with each other. The group information includes "group identifier" and "group name". In the user management table, "group identifier" represents information about a management number for identifying a group. "Group name" represents information about the name of a group.

When receiving from the image forming apparatus 10 an inquiry about a group to which a user belongs, the authentication server 20 references the user management table and notifies the image forming apparatus 10 information about the group to which the user belongs.

Figure 5:
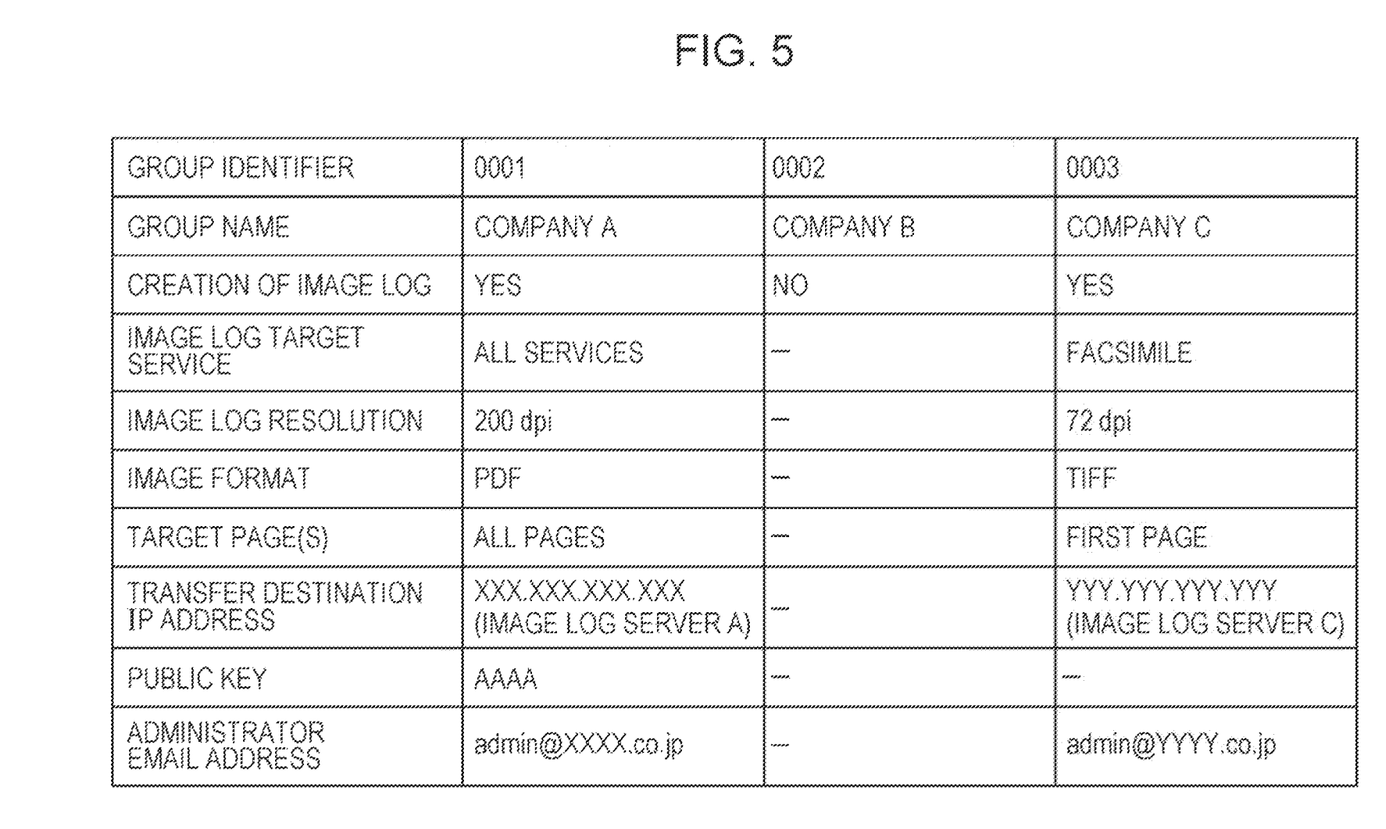
FIG. 5 is a diagram illustrating an example of a setting information management table managed in a security server.

FIG. 5 illustrates an example of a setting information management table managed in the security server 30. As illustrated in FIG. 5, in the setting information management table, information including "group identifier", "group name", "creation of image log", "image log target service", "image log resolution", "image format", "target page(s)", "transfer destination IP address", "public key", and "administrator email address" is managed for each group.

In the setting information management table, "group identifier" represents information about a management number for identifying a group. "Group name" represents information about the name of a group. "Creation of image log" represents information about whether or not an image log needs to be created when a service is executed. A service represents a process that may be performed by the image forming apparatus 10 and used by the user. "Image log target service" represents information about which service needs creation of an image log. "Image log resolution" represents information about the resolution of an image log. "Image format" represents information about the image format of an image log. "Target page(s)" represents information about which page(s) of a service target document needs creation of an image log. "Transfer destination IP address" represents information about an IP address of a transfer destination for a created image log. "Public key" represents information about a public key for the case where a created image log is encrypted by the public-key cryptography. The state in which information about a public key is registered is equivalent to the state in which it is specified that an image log needs to be made confidential. The state in which information about a public key is not registered is equivalent to the state in which it is specified that an image log does not need to be made confidential. "Administrator email address" represents information about an email address of an administrator to which a transfer failure notification is transmitted when transfer of an image log fails.

When receiving from the image forming apparatus 10 an inquiry about setting information about a group to which a user belongs, the security server 30 references the setting information management table and notifies the image forming apparatus 10 of the setting information about the group to which the user belongs.

The control unit 65 causes the authentication unit 61 to perform authentication processing for a user who wants to use the image forming apparatus 10, and identifies the user. Next, the control unit 65 asks the authentication server 20 about a group to which the user belongs, and acquires group information about the group to which the user belongs. Then, the control unit 65 asks the security server 30 about setting information about the group to which the user belongs, and acquires the setting information about the group to which the user belongs. Next, after performing a process instructed by the user, the control unit 65 performs processing regarding an image log in accordance with settings specified in the acquired setting information.

Accordingly, different settings for processing regarding an image log may be set for individual groups. Compared to the case where the same settings are set for all the groups, an operating policy for an image log for each group may be handled flexibly.

For example, when a user 3 uses the image forming apparatus 10, the control unit 65 asks the authentication server 20 about a group to which the user 3 belongs, and acquires, as information about the group to which the user 3 belongs, information indicating that the user 3 belongs to the company A. Then, the control unit 65 asks the security server 30 about setting information about the company A to which the user 3 belongs, and acquires the setting information about the company A.

Next, after performing a process instructed by the user 3, the control unit 65 performs the processing regarding an image log in accordance with the settings specified in the acquired setting information. Specifically, the setting information about the company A indicates that all the services are set for "image log target service". Thus, an image log is created regardless whether the service is copy, facsimile, or email transfer. At this time, the image log is created with a resolution of 200 dpi. The image format of the image log is PDF, and all the pages of a document provided by the user 3 are "target page(s)" for the image log. The created image log is encrypted by a public key AAAA and is transferred to XXX.XXX.XXX.XXX, which is an IP address of the image log server 40A for the company A.

With the configuration described above, even in the case where an administrator of the image forming apparatus 10 who does not belong to the company A retrieves the image log for the company A, the administrator is not able to reference the content of the image log because the administrator does not have the public key for the company A.

In the case where transfer of the image log has failed, the control unit 65 notifies the administrator of the company A to which the user 3 belongs that the transfer of the image log has failed. The notification is transmitted to "admin@XXXX.co.jp", which is recorded in the setting information about the company A.

Furthermore, the control unit 65 prohibits users belonging to the company A from using the apparatus and notifies the users belonging to the company A that the users are prohibited from using the apparatus. The notification may be provided by any method such as displaying a notification indicating that the users belonging to the company A are prohibited from using the apparatus on the display unit 63 of the image forming apparatus 10 when the users try to use the image forming apparatus 10 or transmitting simultaneous emails to all the users belonging to the company A.

As another example, when a user 5 uses the image forming apparatus 10, the control unit 65 asks the authentication server 20 about a group to which the user 5 belongs, and acquires, as information about the group to which the user 5 belongs, information indicating that the user 5 belongs to the company B. Then, the control unit 65 asks the security server 30 about setting information about the company B to which the user 5 belongs, and acquires the setting information about the company B.

Next, after performing a process instructed by the user 5, the control unit 65 performs processing regarding an image log in accordance with settings specified in the acquired setting information. However, since the setting information about the company B indicates that an image log does not need to be created, no processing regarding an image log is performed.

As still another example, in the case where a user 8 uses the image forming apparatus 10, the control unit 65 asks the authentication server 20 about a group to which the user 8 belongs, and acquires, as information about the group to which the user 8 belongs, information indicating that the user 8 belongs to the company C. Then, the control unit 65 asks the security server 30 about setting information about the company C to which the user 8 belongs, and acquires the setting information about the company C.

Next, after performing a process instructed by the user 8, the control unit 65 performs processing regarding an image log in accordance with settings specified in the acquired setting information. Specifically, the setting information about the company C indicates that facsimile is set for "image log target service". Thus, when facsimile is performed, an image log is created. The image log is created with a resolution of 72 dpi. The image format of the image log is TIFF, and the first page of a document provided by the user 8 is "target page(s)" for the image log. The created image log is not made confidential and is transferred to YYY.YYY.YYY.YYY, which is an IP address of the image log server 40C for the company C.

As described above, the image log is created for the limited service, only the first page is set as a target page for the image log, and the image log is created with a low resolution of 72 dpi. Thus, the volume of the image log can be reduced.

Furthermore, in the case where transfer of an image log has failed, the control unit 65 notifies an administrator of the company C to which the user 8 belongs that the transfer of the image log has failed. The notification is transmitted to "admin@YYYY.co.jp", which is recorded in the setting information about the company C.

Furthermore, the control unit 65 prohibits users belonging to the company C from using the apparatus and notifies the users belonging to the company C that the users are prohibited from using the apparatus.

Figure 6:
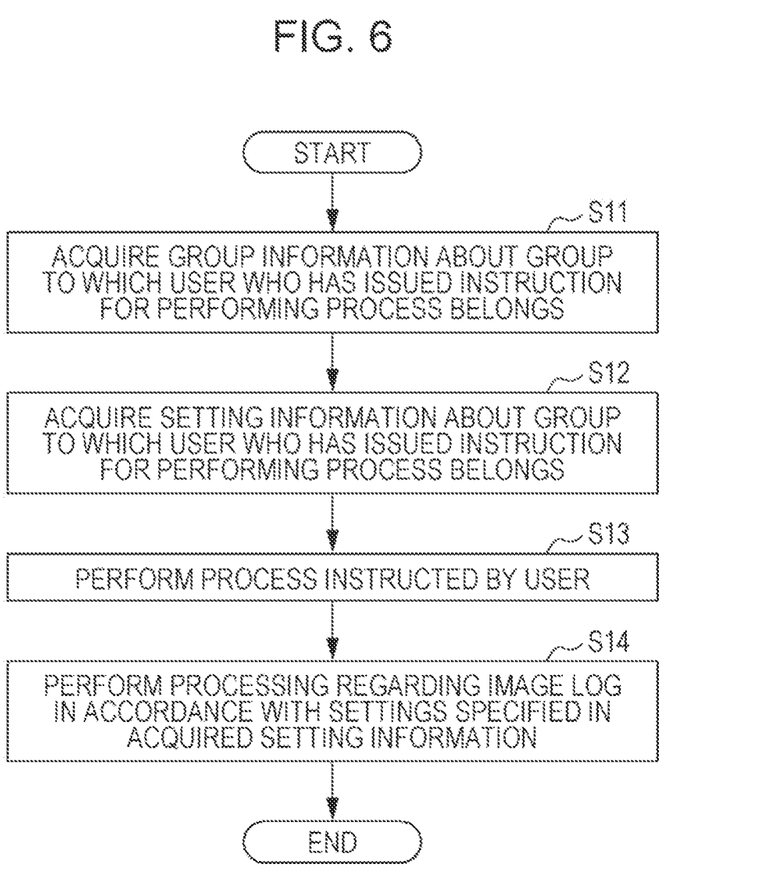
FIG. 6 is a flowchart for explaining an operation performed when a user uses an image forming apparatus.
Figure 7:
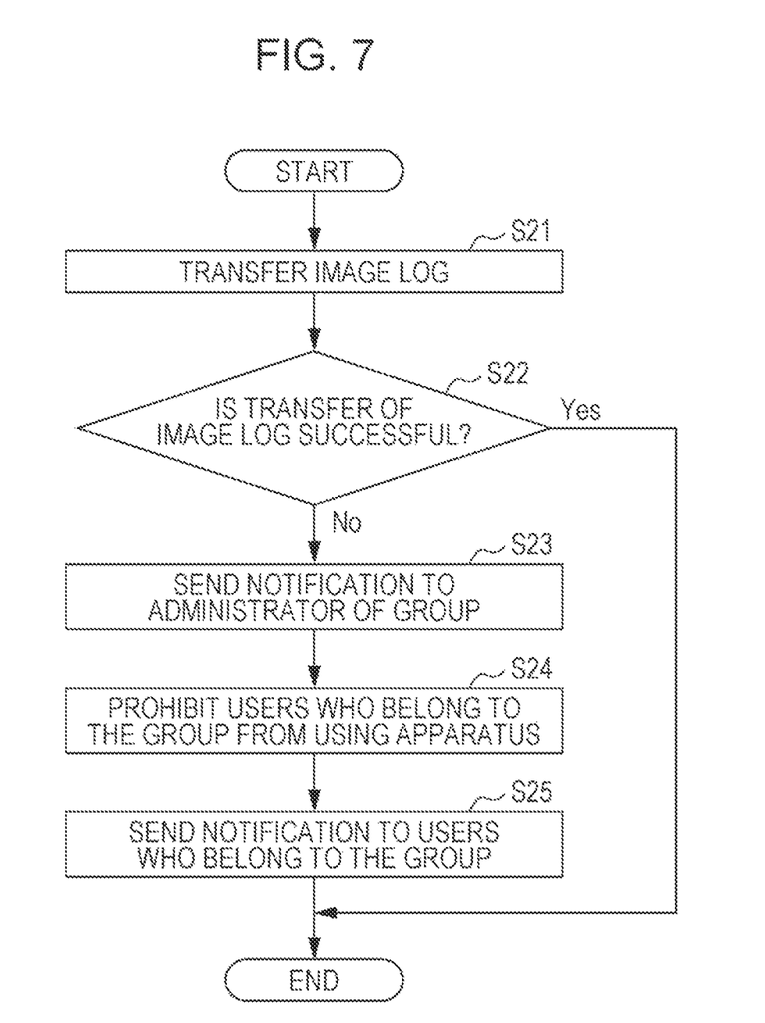
FIG. 7 is a flowchart for explaining an operation performed after an image log is transferred.

Next, an operation of the image forming apparatus 10 according to this exemplary embodiment will be described with reference to flowcharts illustrated in FIGS. 6 and 7.

First, an operation performed when a user uses the image forming apparatus 10 will be described. As illustrated in FIG. 6, in step S11, the control unit 65 acquires group information about a group to which a user who has issued an instruction for performing a process belongs. In step S12, the control unit 65 acquires setting information about the group to which the user who has issued the instruction for performing the process belongs. In step S13, the control unit 65 performs the process instructed by the user. In step S14, the control unit 65 performs processing regarding an image log in accordance with settings specified in the acquired setting information.

Next, an operation performed after the image log is transferred will be described. As illustrated in FIG. 7, in step S21, the control unit 65 transfers the image log. In step S22, the control unit 65 determines whether or not the transfer of the image log is successful.

In the case where it is determined in step S22 that the transfer of the image log is successful, the control unit 65 ends the process.

In the case where it is determined in step S22 that the transfer of the image log is not successful, the control unit 65 notifies an administrator of the group that the transfer of the image log has failed in step S23.

In step S24, the control unit 65 prohibits users belonging to the group to which the user belongs from using the apparatus. In step S25, the control unit 65 notifies the users belonging to the group to which the user belongs that the users are prohibited from using the apparatus. Then, the process ends.

Modifications

Although an image forming system according to an exemplary embodiment of the present disclosure has been described above, the present disclosure is not limited to the exemplary embodiment described above and may be modified in an appropriate manner.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
a processor configured to:
acquire group information about a group to which a user who has issued an instruction for performing a process belongs, the process being at least one of printing an image, copying the image, scanning the image, and faxing the image;

acquire setting information indicating whether image information indicating content of the image and history information about the process need to be recorded in association with each other, the setting information being associated with the group identified based on the acquired group information;

record the image information and the history information in association with each other after performing the process instructed by the user in a case where the acquired setting information indicates that the image information and the history information need to be recorded in association with each other; and not to record the image information and the history information in association with each other in a case where the acquired setting information does not indicate that the image information and the history information need to be recorded in association with each other.

2. The image forming apparatus according to claim 1, wherein the setting information includes a setting regarding whether or not transfer destination information about a transfer destination for the image and history information is present, and wherein the processor is configured to, in a case where the transfer destination information is present in the acquired setting information, transfer the created image and history information to the transfer destination indicated in the transfer destination information.

3. The image forming apparatus according to claim 2, wherein the processor is configured to, in a case where the transfer of the image and history information has failed, notify an administrator of the group to which the user who has issued the instruction for performing the process for which the transfer has failed belongs that the transfer of the image and history information has failed.

4. The image forming apparatus according to claim 3, wherein the processor is configured to, in a case where the transfer of the image and history information has failed, prohibit users who belong to the group to which the user who has issued the instruction for performing the process for which the transfer has failed belongs from using the image forming apparatus.

5. The image forming apparatus according to claim 4, wherein the processor is configured to, in a case where the transfer of the image and history information has failed, notify the users who belong to the group to which the user who has issued the instruction for performing the process for which the transfer has failed belongs that the users are prohibited from using the image forming apparatus.

6. The image forming apparatus according to claim 5, wherein the settings include a setting regarding whether or not the image and history information needs to be made confidential, and wherein the processor is configured to, in a case where the acquired setting information indicates that the image and history information needs to be made confidential, perform processing for making the created image and history information confidential.

7. The image forming apparatus according to claim 4, wherein the settings include a setting regarding whether or not the image and history information needs to be made confidential, and wherein the processor is configured to, in a case where the acquired setting information indicates that the image and history information needs to be made confidential, perform processing for making the created image and history information confidential.

8. The image forming apparatus according to claim 3, wherein the settings include a setting regarding whether or not the image and history information needs to be made confidential, and wherein the processor is configured to, in a case where the acquired setting information indicates that the image and history information needs to be made confidential, perform processing for making the created image and history information confidential.

9. The image forming apparatus according to claim 8, wherein the processing for making the image and history information confidential is processing for encrypting the image and history information by a public key based on a public-key cryptography.

10. The image forming apparatus according to claim 2, wherein the processor is configured to, in a case where the transfer of the image and history information has failed, prohibit users who belong to the group to which the user who has issued the instruction for performing the process for which the transfer has failed belongs from using the image forming apparatus.

11. The image forming apparatus according to claim 10, wherein the processor is configured to, in a case where the transfer of the image and history information has failed, notify the users who belong to the group to which the user who has issued the instruction for performing the process for which the transfer has failed belongs that the users are prohibited from using the image forming apparatus.

12. The image forming apparatus according to claim 11, wherein the settings include a setting regarding whether or not the image and history information needs to be made confidential, and wherein the processor is configured to, in a case where the acquired setting information indicates that the image and history information needs to be made confidential, perform processing for making the created image and history information confidential.

13. The image forming apparatus according to claim 10, wherein the settings include a setting regarding whether or not the image and history information needs to be made confidential, and wherein the processor is configured to, in a case where the acquired setting information indicates that the image and history information needs to be made confidential, perform processing for making the created image and history information confidential.

14. The image forming apparatus according to claim 2, wherein the settings include a setting regarding whether or not the image and history information needs to be made confidential, and wherein the processor is configured to, in a case where the acquired setting information indicates that the image and history information needs to be made confidential, perform processing for making the created image and history information confidential.

15. The image forming apparatus according to claim 14, wherein the processing for making the image and history information confidential is processing for encrypting the image and history information by a public key based on a public-key cryptography.

16. The image forming apparatus according to claim 1, wherein the setting information includes a setting regarding whether or not the image and history information needs to be made confidential, and wherein the processor is configured to, in a case where the acquired setting information indicates that the image and history information needs to be made confidential, perform processing for making the created image and history information confidential.

17. The image forming apparatus according to claim 16, wherein the processing for making the image and history information confidential is processing for encrypting the image and history information by a public key based on a public-key cryptography.

18. An image forming method comprising:

acquiring group information about a group to which a user who has issued an instruction for performing a process belongs, the process being at least one of printing an image, copying the image, scanning the image, and faxing the image;

acquiring setting information indicating whether image information indicating content of the image and history information about the process need to be recorded in association with each other, the setting information being associated with the group identified based on the acquired group information; and recording the image information and the history information in association with each other after performing the process instructed by the user in a case where the acquired setting information indicates that the image information and the history information need to be recorded in association with each other, wherein the image information and the history information are not recorded in association with each other in a case where the acquired setting information does not indicate that the image information and the history information need to be recorded in association with each other.

19. A non-transitory computer readable medium storing a program causing a computer to execute a process comprising:

acquiring group information about a group to which a user who has issued an instruction for performing a process belongs, the process being at least one of printing an image, copying the image, scanning the image, and faxing the image;

acquiring setting information indicating whether image information indicating content of the image and history information about the process need to be recorded in association with each other, the setting information being associated with the group identified based on the acquired group information; and recording the image information and the history information in association with each other after performing the process instructed by the user in a case where the acquired setting information indicates that the image information and the history information need to be recorded in association with each other, wherein the image information and the history information are not recorded in association with each other in a case where the acquired setting information does not indicate that the image information and the history information need to be recorded in association with each other.

\* \* \* \* \*